US007900650B1

(12) United States Patent
Wilson

(10) Patent No.: US 7,900,650 B1
(45) Date of Patent: Mar. 8, 2011

(54) IN-LINE WATER SHUT-OFF SYSTEM AND METHOD OF USE THEREOF

(76) Inventor: Thomas J. Wilson, Gilbert, AZ (US)

(*) Notice: Subject to any disclaimer, the term of this patent is extended or adjusted under 35 U.S.C. 154(b) by 523 days.

(21) Appl. No.: 11/978,486

(22) Filed: Oct. 29, 2007

Related U.S. Application Data

(60) Provisional application No. 60/854,477, filed on Oct. 27, 2006.

(51) Int. Cl.
*F16K 31/02* (2006.01)
*F16K 37/00* (2006.01)
*F17D 1/00* (2006.01)

(52) U.S. Cl. ............... 137/601.14; 137/551; 137/599.11; 251/129.04

(58) Field of Classification Search .................. 137/551, 137/601.14, 599.11; 251/129.04
See application file for complete search history.

(56) References Cited

U.S. PATENT DOCUMENTS

| | | | | |
|---|---|---|---|---|
| 4,760,547 | A * | 7/1988 | Duxbury | 239/69 |
| 4,921,012 | A * | 5/1990 | Bratten | 137/601.14 |
| 5,348,269 | A | 9/1994 | Moseley | |
| 5,539,384 | A * | 7/1996 | Frasier | 340/605 |
| 5,794,653 | A | 8/1998 | DeSmet et al. | |
| 5,921,280 | A * | 7/1999 | Ericksen et al. | 137/624.11 |
| 5,967,171 | A | 10/1999 | Dwyer, Jr. | |
| 6,003,536 | A | 12/1999 | Polverari et al. | |
| 6,105,607 | A | 8/2000 | Caise et al. | |
| 6,209,580 | B1 | 4/2001 | Foster | |
| 6,491,062 | B1 * | 12/2002 | Croft | 137/624.11 |
| 6,612,536 | B2 | 9/2003 | Dalton | |
| 6,758,238 | B2 | 7/2004 | Callies | |
| 6,945,274 | B1 * | 9/2005 | Davis | 137/624.11 |
| 2002/0148515 | A1 * | 10/2002 | Coffey et al. | 137/624.11 |
| 2006/0015543 | A1 * | 1/2006 | Humphrey | 707/202 |

* cited by examiner

*Primary Examiner* — Stephen Hepperle
*Assistant Examiner* — Atif H Chaudry
(74) *Attorney, Agent, or Firm* — Montgomery Patent and Design; Robert C. Montgomery

(57) ABSTRACT

A system that provides for the remote control shutoff of the main water supply to a structure in an unattended manner is herein disclosed. The system comprises a solenoid activated shutoff valve typically mounted immediately downstream of a main water shutoff valve and a locking enclosure containing a remote control switch and audible alarm unit. A manual bypass valve is provided as an override should it be required. Because the system requires electricity to operate, a general power failure will automatically shut off of the water supply. Further, activation of the system is accomplished using a remote control to control the system from a distance.

14 Claims, 3 Drawing Sheets

IN-LINE WATER SHUT-OFF SYSTEM AND METHOD OF USE THEREOF

RELATED APPLICATIONS

The present invention was first described in and claims the benefit of U.S. Provisional Patent Application No. 60/854,477 filed on Oct. 27, 2006, the entire disclosures of which are incorporated herein by reference.

FIELD OF THE INVENTION

The present invention relates generally to an automatic and remote shutoff control for the main water supply to a structure and, more particularly, to said apparatus being capable being operated in an unattended manner.

BACKGROUND OF THE INVENTION

Water damage from a broken pipe, a worn out water heater or other water supplied appliance can cause major property damage and serious financial consequences. The only certain method to guarantee that this does not occur is to shut off the main water line. Unfortunately, many people are incapable of locating the shut-off valve for their water line and may be physically unable to shut it off. Accordingly, there exists a need for a means by which main water flow into a home, building or business can be easily, quickly and remotely shut off without the disadvantages as described above. The development of the invention herein described fulfills this need.

Several attempts have been made in the past to provide a means and a method for a quick and effective shut-off system for in-house utilities, especially main line water valves, particularly during extended periods of non-use. U.S. Pat. No. 6,612,536 issued to Dalton discloses a remote shut-off valve. This patent does not appear to disclose an apparatus that operates on demand using a wireless remote control.

U.S. Pat. No. 6,209,580 issued to Foster discloses a multifunction valve assembly. This patent does not appear to disclose an apparatus that operates on demand using a wireless remote control.

U.S. Pat. No. 6,105,607 issued to Caise discloses a microprocessor controlled water shut-off device. This patent does not appear to disclose an apparatus that operates on demand using a wireless remote control.

U.S. Pat. No. 6,003,536 issued to Polverari discloses an automatic shut-off valve that operates when it senses a leak in the system. This patent does not appear to disclose an apparatus that operates on demand using a wireless remote control.

U.S. Pat. No. 5,967,171 issued to Dwyer discloses a shut-off system for preventing water damage that operates when it detects a leakage of water in the system. This patent does not appear to disclose a solenoid to activate the control valve nor does the apparatus appear to operate on demand using a wireless remote control.

U.S. Pat. No. 5,794,653 issued to DeSmet discloses a water shut-off valve and control system that operates on a timer. This patent does not appear to disclose a control valve operated by a wireless remote control.

U.S. Pat. No. 5,348,269 issued to Moseley discloses an inline pneumatic/mechanical flow control valve system. This patent does not appear to disclose a control valve that operates on demand using a wireless remote control.

SUMMARY OF THE INVENTION

In view of the foregoing disadvantages inherent in the prior art, it has been observed that there is need for an on demand remote wireless control for the main water supply valve to a structure.

The in-line remote control water shut-off system provides a convenient, easy to use method for controlling the flow of water into a residence or commercial structure.

The in-line remote control water shut-off system is comprised of a solenoid, spring return valve, transformer and a wireless RF remote controller.

The in-line remote control water shut-off system is an electrically operated and RF wirelessly controlled apparatus to control the flow of water into a structure.

The in-line remote control water shut-off system is wall mounted downstream of the water meter.

The in-line remote control water shut-off system automatically responds to an interruption in electrical service by closing the main water valve thereby keeping main water pressures elevated for use by emergency services.

The in-line remote control water shut-off system possesses a manual by-pass valve permitting override of the system.

The in-line remote control water shut-off system has a 110 volt electrical supply line which runs to a GFCI outlet and a step down transformer converting the electrical charge to 24 volts for operation of the spring return valve.

The in-line remote control water shut-off system may be used by individuals with physical disabilities which may make it difficult for them to access and manipulate a conventional main water shut-off valve.

The in-line remote control water shut-off system can avoid costly damage to residences and businesses by providing a means to immediately terminate water service in the event of a broken pipe, or inefficient or broken appliance.

The in-line remote control water shut-off system is housed in a lockable cabinet.

The in-line remote control water shut-off system, in an alternative embodiment, possesses an audible or visual alarm to indicate the activation of the spring control valve to alert occupants that the water supply delivery has been altered.

The in-line remote control water shut-off system, in an alternate embodiment, possesses X-10 communication capabilities that enable control of the system via the interne and a remote computer.

The prior art discloses devices which provide control main water supply line water flow through various means. The prior art does not appear to teach a main water line control valve that operates on demand through the use of a wireless remote control with a manual override function.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
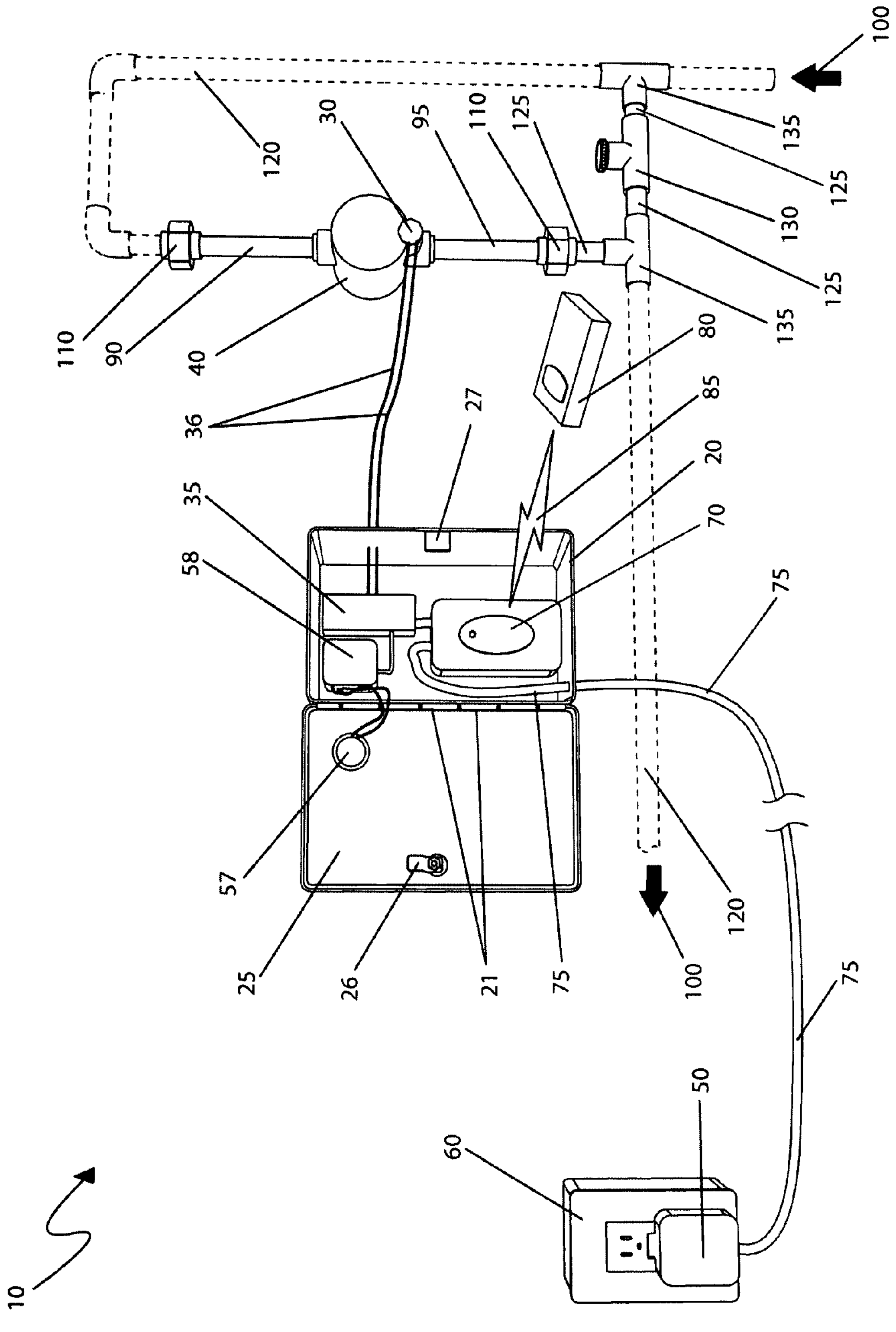
FIG. 1 is a front view of an in-line remote control water shut-off system 10 depicting an open cover portion 25 and remote controller 80, according to the preferred embodiment of the present invention.

10 in-line remote control water shut-off system
20 enclosure
21 hinge
25 cover
26 key lock
27 hasp
30 solenoid
35 terminal strip
36 solenoid wire
40 spring return valve
50 transformer
55 switched power cord
57 speaker
58 audible alarm
60 ground fault circuit interrupt (GFCI) receptacle
70 remote control switch
75 power supply cord
80 remote controller
85 radio frequency (RF) signal
90 water inlet
95 water outlet
100 water flow
110 union fitting
120 water supply plumbing
125 bypass piping
130 bypass valve
135 tee-fitting

DETAILED DESCRIPTION OF THE PREFERRED EMBODIMENT

Figure 2:
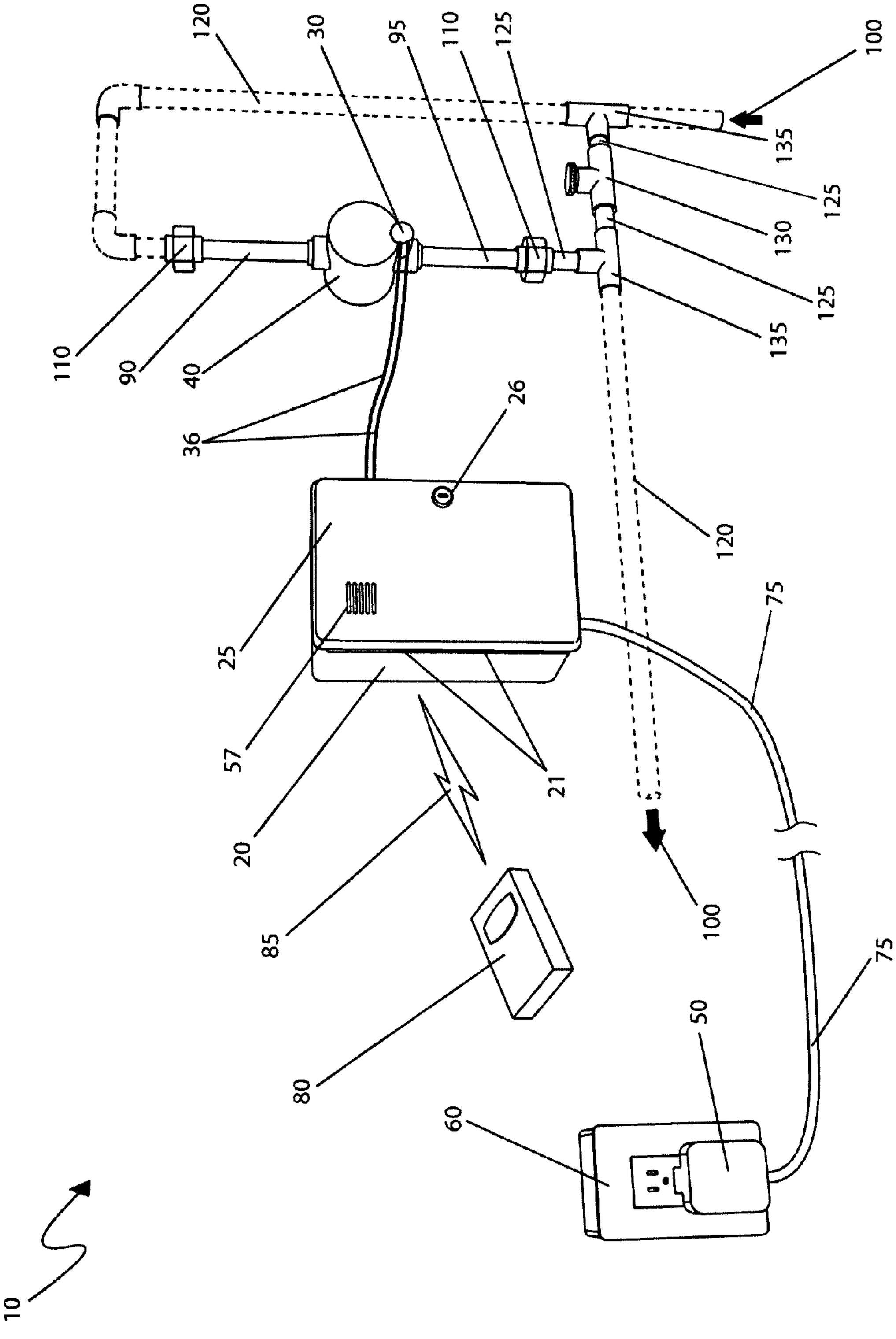
FIG. 2 is a front view of an in-line remote control water shut-off system 10 depicting a closed cover portion 25 and associated plumbing, according to the preferred embodiment of the present invention; and, FIG. 3 is an electrical block diagram of an in-line remote control water shut-off system 10, according to a preferred embodiment of the present invention.
Figure 3:
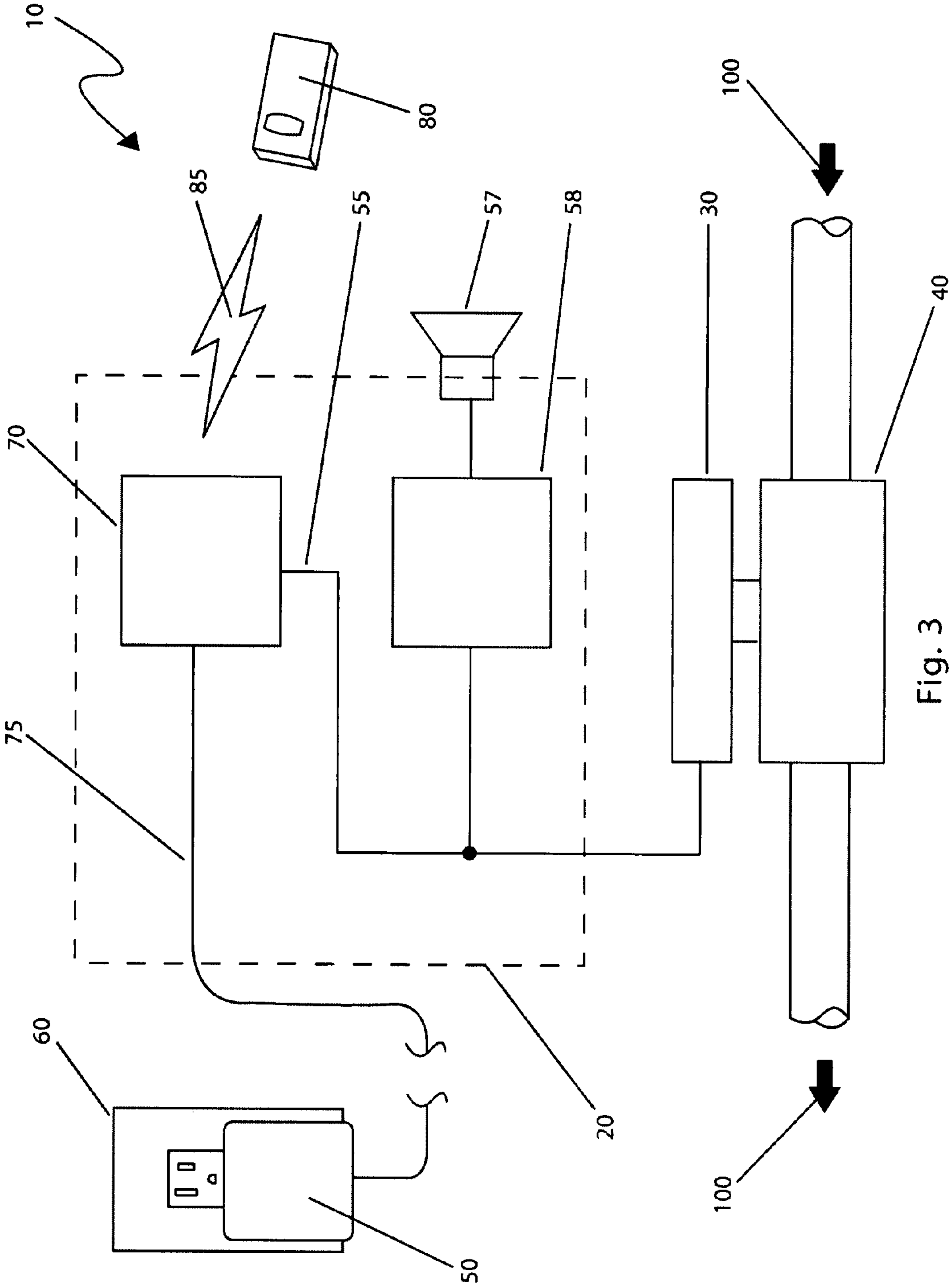

The best mode for carrying out the invention is presented in terms of its preferred embodiment, herein depicted within FIGS. 1 through 3. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a system and method that provides for the remote control shutoff of the main water valve to a structure and/or household appliance in an unattended manner. The in-line water shut-off system (herein described as the "system") 10 provides water flow to cease in the event of a power failure or remotely upon activation of a remote control switch 70 by a remote controller 80. The system 10 comprises a solenoid 30 activated shutoff valve 40 typically mounted immediately downstream of a main water shutoff valve and a locking enclosure 20 containing a remote control switch 70 and audible alarm unit 58. The system 10 further provides a manual bypass valve 130 as an override, should it be required.

Referring now to FIG. 1, a front view of the system 10 depicting an open cover portion 25 and remote controller 80, according to the preferred embodiment of the present invention, is disclosed.

The system 10 comprises electrical supply and conditioning components comprising a ground fault circuit interrupter (GFCI) receptacle 60 at a remote location, a step down transformer 50, and a power supply cord 75. The GFCI receptacle 60 provides electrical power thereto the system being in electrical communication with an existing residential 110-volt electrical power system. The GFCI receptacle 60 comprises a conventional design with a rectangular face, two (2) female adapters embedded therein, and a reset button. The GFCI receptacle 60 provides continuous power to the step down transformer 50. The step down transformer 50 in turn provides 24-volt electrical power to the remote control switch 70 via the power supply cord 75. The step-down transformer 50 comprises a commercially available unit providing a standard 110-volt to 24-volt DC conversion means in an expected manner. It is envisioned that the GFCI receptacle 60 may be provided with X-10 communication capabilities, thereby enabling activation/deactivation of the system 10 via a remote computer and/or internet means, thereby halting or reestablishing a water flow 100 therethrough the system 10. It is further envisioned that the GFCI receptacle 60 may be provided as a common duplex outlet without ground fault protection based upon electrical codes and a user's preference.

The power supply cord 75 provides continuous 24-volt power thereto a lockable enclosure 20 providing a housing and mounting means thereto system components comprising a key lock 26, a hasp 27, a plurality of hinges 21, a cover 25, a remote control switch 70, a power supply cord 75, a switched power cord 55, an audio alarm 58, a terminal strip 35, and a solenoid wire 36. The enclosure 20 comprises a common lockable cabinet with a plurality of hinges 21 along an outer side edge providing an attachment means thereto a cover 25 in an expected manner. The door mounted key lock 26 and hasp 27 provide a security means to the system 10 to prevent tampering. The enclosure 20 is to provide sufficient interior volume to contain the aforementioned components. The enclosure 20, key lock 26, and hinges 21 are envisioned to be made using durable water-proof materials such as stainless steel, fiberglass, plastic, or the like.

The remote control switch 70, when activated by a remote controller 80, conducts power to the terminal strip 35 providing a 24-volt power distribution means and a timely component replacement aid if required. Said 24-volt current is supplied thereto the solenoid 30 activated shutoff valve 40 via a solenoid wire 36. The spring return valve 40 would typically be mounted thereupon a wall surface using common fasteners and located immediately downstream of an existing main water shutoff valve in a residence or business. The system 10 is envisioned to utilize a water inlet source 90 thereto a spring return valve 40 exiting thereto a water outlet 95. The spring return valve 40 is envisioned to be in fluid communication between the water inlet 90 and water outlet 95 for the assisting in the regulation of a flow of water 100 by closing, thereby obstructing the flow of water 100 therethrough the water line. The spring return valve 40 is in the open state as by which meaning water flow 100 is distributed establishing open communication between the water inlet 90 and the water outlet 95. The spring return valve 40 is envisioned to be a normally-closed spring return valve 40 being opened by conducting an electric current therethrough an electrical solenoid 30 mounted thereon said spring return valve 40, thus changing to an open state. The solenoid 30 is controlled directly by a remote control switch 70 located within the enclosure 20, and thus providing a very low reaction time. The spring return valve 40 comprises two (2) ports, in which the water flow 100 is switched on or off. The spring return valve 40 is envisioned to be a commercially available valve such as a gate valve, a ball valve, or equivalent type designed to minimize restriction to the water flow 100 when in an open state. The spring return valve 40 is envisioned to comprise metal or rubber seals designed to effectively seal the water flow 100 when in the closed state.

A user may engage a halting or opening action acting upon a continuous water flow 100 of a main water line by successive actuation of the remote controller 80. More specifically, to engage a halting of said water flow 100, said remote controller 80 transmits a controlled RF signal 85 thereto a remote control switch 70, thereby halting an electrical current thereto the solenoid portion 30 of the spring return valve 40, thereby closing said valve 40. This action closes the spring return valve 40 in communication between water inlet 90 and water outlet 95 halting the water flow 100 therethrough the system 10. To reestablish water flow 100 therethrough the water line, actuation of the remote controller 80 provides an opening action thereto the spring return valve 40, thereby providing a reestablishment of fluid continuity therebetween the inlet 90 and the outlet 95. The remote controller 80 provides transmission of a radio frequency (RF) signal 85 thereto the remote control switch 70. The remote control switch 70 is envisioned to provide a sealed housing to prevent water and/or corrosion from coming in contact with said remote control switch 70.

In addition to the remote activation of the spring return valve 40 as described above, the system 10 provides a halting function thereto the water flow 100 upon the loss of electrical power therefrom the power supply cord 75 in the event of a local power failure, an open electrical breaker, or the like.

The terminal strip 35 also provides 24-volt power to an audio alarm unit 35 within the enclosure 20. The audio alarm unit 58 provides an audio alarm means, thereby providing an indication to occupants within a residence or commercial building of a stoppage of water supply resulting therefrom a general power failure within said residence or due to remote activation of the remote control switch 70. The audio alarm 58 is envisioned to be a commercially available battery-backup alarm module comprising an internal battery, switching hardware, wiring, and a speaker 57. The speaker 57 is envisioned to be a common miniature piezo-electrical type device.

Referring now to FIG. 2, a front view of the system 10 depicting a closed cover portion 25 and associated plumbing, according to the preferred embodiment of the present invention, is disclosed. The system 10 comprises an enclosure 20, a pair of union fittings 110, a bypass valve 130, a pair of tee-fittings 135, and various bypass piping 125.

The union fittings 110 provide a plumbing connection means thereto existing water supply plumbing 120 in a residence or business as depicted here. Additionally, the system 10 comprises a bypass valve 130, a pair of tee-fittings 135, and various bypass piping 125 required to establish direct fluid communication therebetween the water inlet 90 and the water outlet 95 portions. The bypass valve 130 provides an override means to the system 10 should it be required. The spring return valve 40, union fittings 110, and bypass piping 125 are envisioned to comprise preferably a similar diametrical size as an existing plumbing system 120 within a residence so as to maintain a consistent flow and pressure through the system 10.

FIG. 3 is an electrical block diagram of the system 10, according to a preferred embodiment of the present invention. The system 10 as depicted here receives 110-volt AC power from a local GFCI receptacle 60. A step-down transformer 50 is plugged thereinto said GFCI receptacle 60 in an expected manner, thereby conducting a 24-volt current to the remote control switch 70 via a power supply cord 75. Said remote control switch 70 provides a switching function similar to common garage door opening devices being activated by a RF signal 85 transmitted therefrom a hand-held remote controller 80. The remote controller 80 allows a user to remotely control the water flow 100 when desired during events such as, but not limited to, periods in which a residence is unoccupied, controlling water usage during particular periods of a day or week, and the like. The RF signal 85 is envisioned to be a one-way signal and does not provide for duplex communication or confirmation of a received RF signal 85. It is envisioned that the RF signal 85 would be of a frequency modulated (FM) signal on a frequency authorized for such use; however, other methods of modulation such as amplitude modulation, single side band, digital, continuous wave and the like would work equally well, and as such, should not be interpreted as a limiting factor of the system 10. When activated to establish a water flow 100 therethrough, said remote control switch 70 conducts a 24-volt current thereto an audible alarm 58 and the solenoid portion 30 of the spring return valve 40, thereby opening said valve 40 maintaining a water flow 100 therethrough. Conversely, if said remote control switch 70 is activated to initiate a stoppage of a water flow 100 therethrough the system 10, said output current is interrupted causing the spring return valve 40 to close and halt said water flow 100. Said output voltage thereto the audible alarm unit 58 provides a power interruption audible alarm via a piezo speaker 57 during water flow 100 stoppages being initiated by an interruption of said output current therefrom said remote control switch 70. Stoppage of said water flow 100 due to a loss of electrical power thereto said solenoid 30, may result from events such as activation of the remote control switch 70; or a general power supply failure. Additionally, activation/deactivation of the system 10 may be provided via a GFCI receptacle 60 comprising X-10 communication capabilities, thereby enabling remote activation via a computer and/or internet means.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. A skilled plumber or other professional may be required for the installation of the system 10. After initial purchase or acquisition of the system 10, it would be configured as indicated in FIG. 1.

The method of installing and utilizing the system 10 may be achieved by performing the following steps: mounting the enclosure 20 at a location either adjacent to or remote of the main shutoff valve of the main water line, installing the solenoid valve 40 immediately downstream of the main water shutoff valve using the union fittings 110; installing the bypass valve 130 using the provided tee-fittings 135 and bypass piping 125; activating the system 10 by connecting the transformer 50 thereto a GFCI receptacle 60 using the power supply cord 75; transmitting an OPEN signal 85 therefrom a remote controller 80 thereto the remote control switch 70; enabling a water flow 100 therethrough the spring return valve 40 reestablishing fluid continuity therebetween the inlet 90 and the outlet 95; transmitting a CLOSE signal 85 therefrom a remote controller 80; stopping a water flow 100 therethrough the spring return valve 40; automatically broadcasting an audible alarm 58 to occupants of a building indicating stoppage of said water flow 100; alternately, experiencing a general loss of power therefrom a central power source; interrupting an electrical current to the solenoid 30; stopping a water flow 100 therethrough the spring return valve 40; automatically broadcasting said audible alarm 58; and, benefiting from automatic and/or remote control shut-off of a main water supply, thereby protecting a residence or commercial building from water damage which may result from being temporarily unattended.

Additionally, the bypass valve 130 may be utilized as a water flow 100 override should it be required by disconnecting the transformer 50 therefrom the GFCI receptacle 60 and manually opening the bypass valve 130 by rotating a valve lever or knob thereupon in a counter-clockwise direction, thereby establishing an optional fluid path therebetween water inlet 90 and outlet 95 portions.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A system for remotely controlling a shutoff of a main water valve of a main water line to a structure and/or household appliance, comprising:

an electrically active solenoid shutoff valve mounted downstream from an existing manual shutoff valve;

a securable enclosure comprising a remote control switch in electrical communication therewith said electrically active shutoff valve and an alarm unit in electrical communication therewith said remote control switch;

a power supply, further comprising:

a ground fault circuit interrupter (GFCI) receptacle in electrical communication therewith an existing residential power system;

a step down transformer in electrical communication therewith said GFCI receptacle; and, a power supply cord;

a remote control; and, a manual bypass valve and associated piping;

wherein said system forces a water flow to cease in an event of a power failure or remotely upon activation of a remote control switch by said remote controller;

wherein said (GFCI) receptacle provides continuous power thereto said step down transformer;

wherein said GFCI receptacle further comprises X-10 communication capabilities, thereby enabling activation/deactivation of said system via a remote computer thereby halting or reestablishing said water flow through said system;

wherein said step down transformer provides electrical power thereto said remote control switch via said power supply cord;

wherein said enclosure is mountable remote or adjacent thereto said electrically active shutoff valve at a distance required by local electrical codes; and;

wherein said manual bypass valve provides an optional water flow thereto said main water line.

2. The system of claim 1, wherein said step down transformer is a standard 110-volt to 24-volt DC converter.

3. The system of claim 1, wherein said enclosure is a waterproof and resilient device comprising:

a lockable cover hingedly attached to box and defining an interior within;

a mounting means for mounting said enclosure thereto a support structure; and, a set of electronic components mounted and secured therein said interior, further comprising:

said remote control switch comprising an RF receiver;

a switched power cord in electrical communication therewith said remote control switch at a proximal end;

said alarm unit in electrical communication therewith said remote control switch via said switched power cord;

a terminal strip in electrical communication therewith said remote control switch via said switched power cord; and, an electrically active shutoff valve wire electrically connecting said terminal strip thereto said electrically active shutoff valve;

wherein said lockable cover provides a security means to said interior to prevent tampering;

wherein said power supply cord is routed therefrom said power supply thereto said remote control switch and supplying power thereto;

wherein said alarm unit is activated during a power interruption; and, wherein said enclosure provides a sufficient interior volume to contain said remote control switch, switched power cord, alarm unit, and terminal strip.

4. The system of claim 3, wherein said alarm unit is an audible alarm comprising an internal battery, switching hardware, wiring, and a speaker.

5. The system of claim 1, wherein said remote control comprises a hand-held device with a transmitting button that, when depressed, transmits a first and a second RF signal thereto said RF receiver of said remote control switch;

whereupon receipt of said first RF signal, said remote control switch halts an electrical current thereto said electrically active valve, thereby closing said electrically active valve;

whereupon receipt of said second RF signal, said remote control switch permits said electrical current thereto said electrically active valve, thereby opening said electrically active valve; and, wherein said remote control provides a halting or opening action acting upon said water flow by successive actuation of said electrically active shutoff valve.

6. The system of claim 5, wherein said first and second RF signal comprises a one-way frequency modulated (FM) signal.

7. The system of claim 1, wherein said manual bypass valve and associated piping further comprises various fittings and piping dimensions required to establish direct fluid communication therebetween a water inlet and a water outlet, thereby bypassing said electrically active shutoff valve so as to maintain a consistent flow and pressure through the system.

8. A system for remotely controlling a shutoff of a main water valve of a main water line to a structure and/or household appliance, comprising:

an electrically active shutoff valve mounted downstream from an existing manual shutoff valve;

a ground fault circuit interrupter (GFCI) receptacle in electrical communication therewith an existing residential power system;

a step down transformer in electrical communication therewith said GFCI receptacle;

a power supply cord;

a securable enclosure further comprising:

a lockable cover hingedly attached to box and defining an interior within;

a mounting means for mounting said enclosure thereto a support structure; and, a set of electronic components mounted and secured therein said interior, further comprising:

said remote control switch comprising an RF receiver;

a switched power cord in electrical communication therewith said remote control switch at a proximal end;

said alarm unit in electrical communication therewith said remote control switch via said switched power cord;

a terminal strip in electrical communication therewith said remote control switch via said switched power cord; and, an electrically active shutoff valve wire electrically connecting said terminal strip thereto said electrically active shutoff valve;

a remote control comprises a hand-held device with a transmitting button that, when depressed, transmits a first and a second RF signal thereto said RF receiver of said remote control switch; and, a manual bypass valve and associated piping;

wherein said system forces a water flow to cease in an event of a power failure or remotely upon activation of a remote control switch by said remote controller;

wherein said enclosure is mountable remote or adjacent thereto said electrically active shutoff valve at a distance required by local electrical codes;

wherein said lockable cover provides a security means to said interior to prevent tampering;

wherein said power supply cord is routed therefrom said step down transformer thereto said remote control switch and supplying power thereto;

wherein said alarm unit is activated during a power interruption;

wherein said enclosure provides a sufficient interior volume to contain said remote control switch, switched power cord, alarm unit, and terminal strip;

whereupon receipt of said first RF signal, said remote control switch halts an electrical current thereto said electrically active valve, thereby closing said electrically active valve;

whereupon receipt of said second RF signal, said remote control switch permits said electrical current thereto said electrically active valve, thereby opening said electrically active valve;

wherein said remote control provides a halting or opening action acting upon said water flow by successive actuation of said electrically active shutoff valve;

wherein said manual bypass valve provides an optional water flow thereto said main water line.

9. The system of claim 8, wherein said electrically active shutoff valve is a solenoid valve.

10. The system of claim 8, wherein said step down transformer is a standard 110-volt to 24-volt DC converter.

11. The system of claim 8, wherein said GFCI receptacle further comprises X-10 communication capabilities, thereby enabling activation/deactivation of said system via a remote computer thereby halting or reestablishing said water flow therethrough said system.

12. The system of claim 8, wherein said alarm unit is an audible alarm comprising an internal battery, switching hardware, wiring, and a speaker.

13. The system of claim 8, wherein said first and second RF signal comprises a one-way frequency modulated (FM) signal.

14. A method of installing and utilizing a system for remotely controlling a shutoff of an electrically active shutoff valve of a main water line to a structure and/or household appliance comprises the following steps:

mounting an enclosure remote or adjacent thereto an existing main water shutoff valve at a minimal distance determined by local codes, said enclosure comprising:

a lockable cover hingedly attached to box and defining an interior within;

a mounting means for mounting said enclosure thereto a support structure; and, a set of electronic components mounted and secured therein said interior, further comprising a remote control switch comprising an RF receiver, a switched power cord connected at a proximal end thereto said remote control switch, a terminal strip in electrical communication therewith said switched power cord, and an alarm unit in electrical communication therewith said switched power cord;

mounting a GFCI receptacle adjacent thereto said enclosure;

installing said electrically active shutoff valve immediately downstream of said main water shutoff valve using conventional plumbing techniques and fittings;

installing a bypass valve around said electrically active shutoff valve using provided fittings and piping;

connecting an electrically active shutoff valve wire from said terminal strip of said enclosure thereto said electrically active shutoff valve;

connecting a power supply cord routed therefrom a step down transformer plugged into said GFCI receptacle thereto said remote control switch of said enclosure and supplying power thereto, activating said system by connecting said step down transformer thereto said GFCI receptacle using said power supply cord;

transmitting a first RF signal therefrom a remote control thereto said RF receiver of said remote control switch, thereby enabling a water flow therethrough said electrically active shutoff valve;

transmitting a second RF signal therefrom said remote control thereto said RF receiver to said remote control switch, thereby stopping a water flow therethrough said electrically active shutoff valve;

automatically broadcasting an audible alarm via said alarm unit to occupants of a building indicating stoppage of said water flow due to receipt of said second RF signal;

automatically broadcasting an audible alarm via said alarm unit to occupants of a building indicating stoppage of said water flow due to a general loss of power therefrom a central power source, which interrupts an electrical current thereto said electrically active shutoff valve and stops said water flow; and, protecting a residence or commercial building from water damage which may result from being temporarily unattended.

* * * * *